United States Patent
Crocker

(10) Patent No.: US 7,882,022 B2
(45) Date of Patent: Feb. 1, 2011

(54) COMPUTER SUPPORT FOR MORTGAGE LOCK OPTION

(75) Inventor: Greg H. Crocker, Sanford, FL (US)

(73) Assignee: Peter K. Trzyna, Chicago, IL (US)

( * ) Notice: Subject to any disclaimer, the term of this patent is extended or adjusted under 35 U.S.C. 154(b) by 1598 days.

(21) Appl. No.: 10/867,520

(22) Filed: Jun. 13, 2004

(65) Prior Publication Data

US 2005/0240516 A1  Oct. 27, 2005

Related U.S. Application Data

(60) Provisional application No. 60/478,306, filed on Jun. 13, 2003.

(51) Int. Cl.
*G06Q 40/00* (2006.01)

(52) U.S. Cl. ............... 705/38; 705/35; 705/36 R

(58) Field of Classification Search .......... 705/35, 705/36 R, 38, 39, 37

See application file for complete search history.

(56) References Cited

U.S. PATENT DOCUMENTS

| | | | |
|---|---|---|---|
| 6,173,270 B1* | 1/2001 | Cristofich et al. | 705/37 |
| 7,120,601 B2* | 10/2006 | Chen et al. | 705/36 R |
| 7,149,713 B2* | 12/2006 | Bove et al. | 705/36 R |
| 7,472,089 B2* | 12/2008 | Hu et al. | 705/38 |
| 7,593,890 B1* | 9/2009 | Bradley et al. | 705/38 |
| 7,630,986 B1* | 12/2009 | Herz et al. | 1/1 |
| 7,689,494 B2* | 3/2010 | Torre et al. | 705/36 R |
| 2003/0126054 A1* | 7/2003 | Purcell, Jr. | 705/36 |
| 2003/0172018 A1* | 9/2003 | Chen et al. | 705/36 |
| 2004/0199372 A1* | 10/2004 | Penn | 703/22 |
| 2005/0004855 A1* | 1/2005 | Jenson et al. | 705/35 |
| 2005/0010510 A1* | 1/2005 | Brose et al. | 705/35 |
| 2005/0187851 A1* | 8/2005 | Sant | 705/36 |
| 2006/0010060 A1* | 1/2006 | Jones et al. | 705/35 |
| 2006/0095292 A1* | 5/2006 | Cumming | 705/1 |
| 2006/0190372 A1* | 8/2006 | Chhabra et al. | 705/35 |
| 2006/0271466 A1* | 11/2006 | Gorbatovsky | 705/35 |

OTHER PUBLICATIONS

"A Consumer's Guide to Mortgage Lock-Ins." Mortgage-X. http://www.mortgage-x.com/brochure/lock-ins.htm, as viewed on www.archive.org from Feb. 4, 2003.*

Anonymous "Amex begins trading capped options tied to two of its indexes." Wall Street Journal. New York, NY: Nov. 15, 1991 p. C8.*

S. Aguais et al.; "Building a Credit Risk Valuation Framework for Loan Instruments"; Algo Research Quarterly, vol. 3, No. 3, Dec. 2000.

(Continued)

*Primary Examiner*—Kelly Campen
(74) *Attorney, Agent, or Firm*—Peter K. Trzyna, Esq.

(57) ABSTRACT

A computer-aided method for carrying out an option on a loan, for example a residential mortgage loan, the method including the steps of: receiving information into a memory, the specifications defining the option on the loan, the specifications including a trigger for executing the option, the specifications such as an interest rate; evaluating the trigger with a computer accessing further data; and if the trigger is detected, signaling execution of the option. The option can be, for example, an interest rate floor, ceiling, or both. Computer cooperation can facilitates closing of the loan and downstream processing, if so desired.

24 Claims, 2 Drawing Sheets

OTHER PUBLICATIONS

Tutorial, "Interest Rate Caps and Floors"; http://web.archive.org/web/20031227073926/http://www.fincad.com/support/developerFunc/mathref/RATECAP.htm; Dec. 27, 2003.

Kenneth R. French; Pricing Financial Futures Contracts: An Introduction, Financial Markets and Portfolio Management (Jun. 1988).

PCT International Search Report for PCT/US05/20784, filed Jun. 13, 2005. pp. 1-3.

PCT Written Opinion of the International Searching Authority for PCT/US05/20784, filed Jun. 13, 2005. pp. 1-4.

"A Consumer's Guide to Mortgage Lock-Ins." Mortgage-X. hap://www.mortgage-x.com/brochure/lock-ins.htm, as viewed on www.archive.org from Feb. 4, 2003.

* cited by examiner

COMPUTER SUPPORT FOR MORTGAGE LOCK OPTION

PRIORITY

This application claims priority from, and incorporates by reference, U.S. Patent Application Ser. No. 60/478,306 filed Jun. 13, 2003, by the same inventor.

TECHNICAL FILED

The technical field is computers and data processing systems, as illustrated more particularly herein. Exemplary embodiments include, depending on the implementation, apparatus, a method for use and method for making, and corresponding products produced thereby, as well as data structures, computer-readable media tangibly embodying program instructions, manufactures, and necessary intermediates of the foregoing.

MODES

Figure 1:
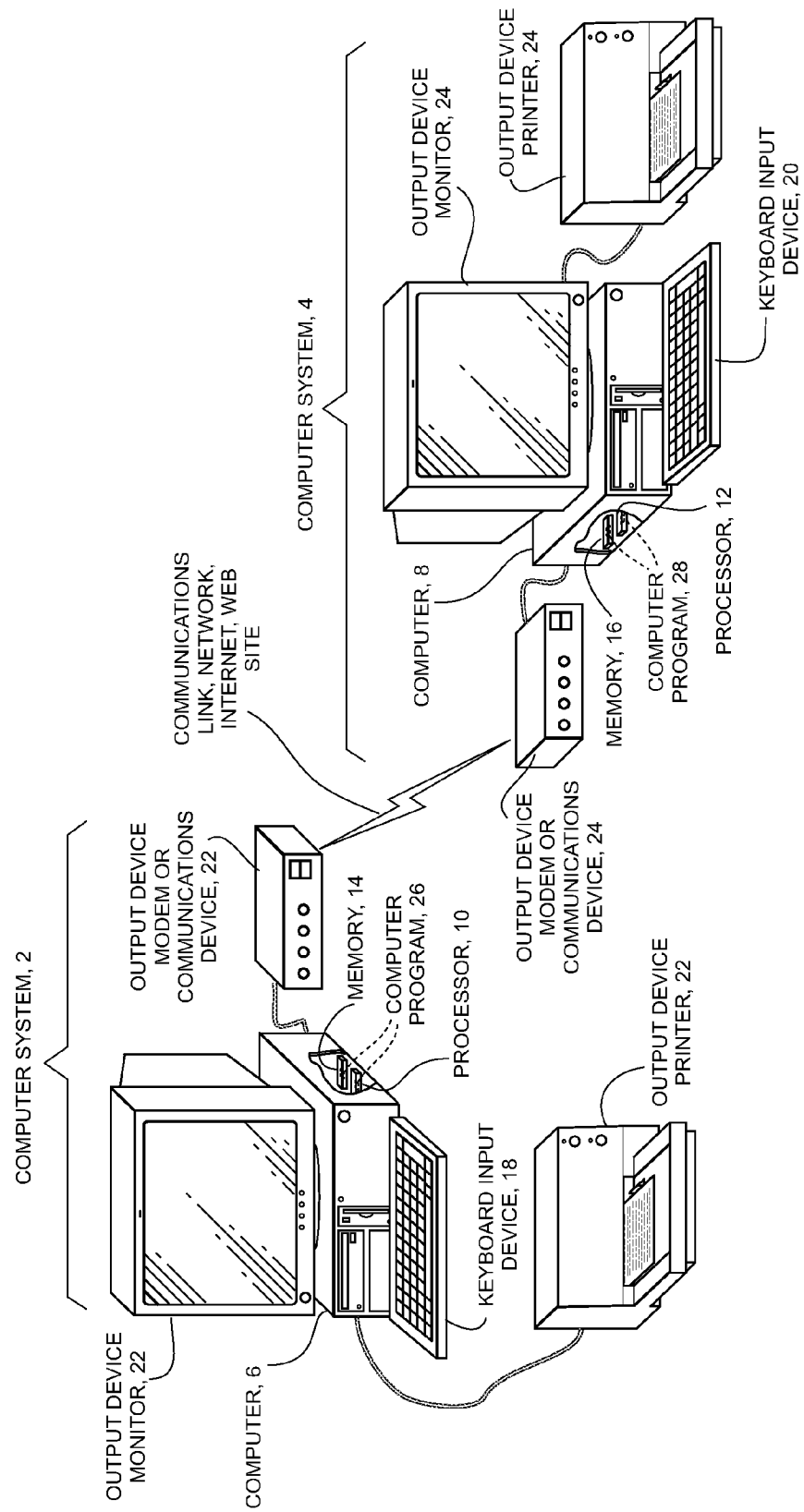
FIG. 1 illustrates an overview of an embodiment.

The accompanying drawings illustrate embodiments intended to illustrate and exemplify in a teaching manner.

As used herein, the term "computer" generally refers to hardware or hardware in combination with one or more program(s), such as can be implemented in software. Computer aspects can be implemented on one or more general purpose computers or specialized devices, and can operate electrically, optically, or in any other fashion. A computer as used herein can be viewed as at least one computer having all functionality or as multiple computers with functionality separated to collectively cooperate to bring about the functionality. Logic flow can represent signal processing, such as digital data processing, communication, or otherwise as evident from the context hereinafter. Logic flow can be implemented in discrete circuits. Computer-readable media, as used herein can comprise at least one of a RAM, a ROM, a disk, an ASIC, and a PROM. Industrial applicability is indicated below.

By way of the following prophetic teaching, there is provided computer support, as in a data processing system, for implementing parts of, or in connection with, a financial product or instrument to accomplish certain financial objectives. The financial aspects include an option on a price (e.g., interest rate) of a mortgage or other loan, or an option on some other aspect of a loan. The option can involve something similar to a put, call, or both (i.e., a butterfly spread") in securities. However, the instant option context is a mortgage or other loan, typically these or another consumer loan, with differences and consequences flowing from the different context, e.g., an option for yield spread premium on an interest rate lock. Also in contrast, depending on the embodiment, the recipient of the option can specify parameters such as the option floor, ceiling, etc. and even both or other mortgage features all in the same instrument or "instrument package." In that an exercised option for an embodiment herein, it is not necessary that the borrower or offeree go through with the transaction, which is another difference from the kind of options exercised in the securities market, though of course other differences exist as well, e.g., regulatory differences, etc. Another difference, again depending on the embodiment, can be to allow the respective buyers to set their own criteria or their ranges for the option (alternatively, the such specifying of the option can be done by the offeror, and recognizing again that the option may pertain to some feature other than, or in addition to, interest rate). Typical securities options have fixed criteria. For example, an applicant could set up an essentially open-ended time period for an option, such as the point where a refinancing makes sense. What makes sense may change as the loan is repaid, for example, so a formulaic option structure can also be handled by computer.

Loans such as mortgages can have interest rates that fluctuate until there is a lock in, which can occur at any time prior to, or at, the time of the closing. Given the uncertainties of interest rate fluctuations, lenders can offer to guarantee or lock in an interest rate at the time of the mortgage application or before the closing, a choice that the loan originators can present to the mortgage customer. One type of lock in is a float down, which typically permits an offeree to lock in at one rate, and communicate later to lock in a later rate. As generally provided herein, an option is made available by an offeror (e.g., an originator such as a lender) to an offeree (e.g., a borrower, or a $3^{rd}$ party, such as a mortgage broker, etc.). The offeree is offered a put option and/or a call option, or both, on the price or other feature(s) of a loan (e.g., mortgage), depending on the particular embodiment that may be desired. The option permits the offeree to get a floor and/or ceiling at the time of the application (or subsequently if desired in a particular application) rather than a mere float, lock in, or lock in with a float down.

The subject matter herein relates to the structure and methods and products produced thereby, finding utility in connection with the particular option illustrated herein; therefore of concern is computer support facets for implementation of such an option, and computing consequences that can flow there from. For general understanding, while particular advantages depend on the particular embodiment, such that an advantage in one embodiment may or may not apply to a different embodiment, consider as an example an option built on mortgage price, e.g., interest rate. Please again note that price is illustrative and not exclusive, as other loan features can be made subject to an option approach, and the loan need not be a mortgage, but can be otherwise, such as an automobile loan, other consumer loan, other loan, etc. Thus, depending on the embodiment, an advantage to the $3^{rd}$ party is that the $3^{rd}$ party can make or save more money from the mortgage "sale" if the value of the lock goes up. And protection on loss from the floor is advantageous too if the price value falls. Depending on circumstances or preferences, the combined ceiling and floor can be preferable to a put or call alone. Note too that it can be efficient to set a spread in one instrument or package, rather than separately, and at one time, rather than at different times. An advantage to the consumer, broker, or other offeree can be that he, she, or it need not risk a float, take a lock in that can become unsatisfactory with more price movement, or watch day to day or moment to moment for such a movement with a float down and then communicate to effectuate the lock. For perspective, a broker or other originator, can have many loans in the pipelines: i.e., the broker is not just working on one loan. Thus, an automatic system such as discussed herein would help in that once the up and/or down parameters are specified, the broker can forget about it and rely on automatic execution of the option.

An advantage to the originator can be that there should be more pull through as there would be a decreased motive for a borrower to apply for another product subsequent to the application. Plus there is the value to the originator of knowledge as to where a borrower claims to be satisfied with a lock in. This should be advantageous to lenders who can attract more sales from the 3$^{rd}$ parties that prefer the option approach to the usual approaches now in the market.

Note again that this example is illustrative, as other approaches can be taken, such as the option being exercised and, perhaps for consideration, the lock can be made subject to a subsequent float down. Another possibility is for the option being exercised and, perhaps for consideration and giving up the exercised option, a subsequent option position can be implemented. Another aspect is that some change in the mortgage other than price or rate can trigger an option, e.g., to change loan products. An option can also trigger a free application, adding a service, such as a free credit report, or even effect a change to a different loan product. Depending on the desired implementation of an option feature, essentially any loan-associated product or service can be tied in. Many possibilities exist.

While there can be many variations on the theme, and parties can include loan officers, brokers, etc., there are basically two categories: originators and borrowers. That is, one is either originating a loan or taking the loan.

The option involves an "offeror" (who is making the offer of the option) and "offeree" (who is in a position to accept the option, e.g., can essentially say "yes, I will take that option" or "no, I will not take that option" or otherwise set terms of the option). Thus, for example, the offeror could be such as the originator or the lender, and the offeree could be such as the borrower or the originator, depending on which business channel one is using. In the case of an originator offeree, the situation can refer to a lender or other originator communicating to another business entity that is involved in origination, i.e., not a borrower. And depending on who is making the option offer, one is the offeror, and the other is the offeree, and herein, it is preferable to speak in those terms rather than in terms of brokers and originators: where for example, depending on the embodiment, an originator could be either an offeror or an offeree. In any case, once there is an agreement that the offeror's offer of an option has been accepted by offeree, that information is then conveyed to an offeree computer, i.e., either the originator or the lender, as may be the particular case.

The offeree can be such as the borrower or the originator, but one embodiment or another will depend on the business channel at issue (e.g., used for originating) and other aspects of the individual application.

For originators, there are various institutional possibilities. There are other lenders, other brokers, and other banks, for example.

For borrowers (or applicants to be borrowers), there is the person, people, or entity receiving a loan.

Recognize that the disclosure herein uses residential mortgage interest rates as a way of teaching the broader concept, so again please note that there are many possible embodiments and applications. Though each kind of loan has its special features, with this in mind, home mortgages need not be the only embodiment of the option approach; generally lending such as where an interest rate exists, is ripe for a comparatively simpler rate lock option. Embodiments can include commercial mortgages, though corresponding rates do not change as much as residential rates. There can be other kinds of loans too, such as home equity, refinancings, car loans, credit card lending, etc.

In a general case, however, a computer system handles the options and all that flow along with implementation thereof. As to floor and/or ceiling and/or other option triggers, preferably offer data is communicated by an offeror, such as an originator, e.g., a lender, but could otherwise be such as a wholesaler, broker, etc. A typical recipient of the offer (offeree) could be a borrower, but could be a broker or other lender, etc. depending on the situation.

Note too that embodiments system can be carried out by a borrower communication in an application completed over an Internet-type or other (e.g., intranet) network, noting security as may be used to protect the communications. The originator's (offeror's) computer system receives and stores the floor, ceiling, and expiration date (not beyond closing date) and other data. The offeror's computer system tests the floor and ceiling against the interest rate from time to time as the rate (or other trigger) changes to determine when, if at all by means of the option, the interest rate hits the floor or ceiling, whereupon the interest rate becomes locked. Allowance can also be made for an applicant to communicate an override to the option, for example, by doing a lock in prior to the option strike price or trigger.

The computer system produces a signal to confirm the lock, which can trigger a communication to the offeree (e.g., borrower). In addition to the foregoing, again in a general case, the originator computer is engaged in monitoring, acceptance, confirming, analysis, and other computer support. Such support includes generating reports, doing statistical work, forecasting, stress testing and potential gain/loss analysis on interest rate movement, etc.

From an originator/lender/option offeror's point of view consider, one seeks to attract applicants, and an alternative such as the option feature can play a role in attracting customers; but there is more. Next one seeks to turn applicants into borrowers: Sometimes, after everyone has expended the work (i.e., cost) of taking a loan application and processing the application, the loan does not close. One reason that a loan might not close is that the applicant is not qualified for the loan. However, another reason can be that a competing loan product becomes so attractive that the applicant pursues the other loan. Depending on how the option system is implemented, it can provide a tool or means for allowing the originator to capture the commitment from the borrower to do business with them even if the rate today is not the rate that they are perfectly happy with.

Imagine that the interest rates today are at 6¼ percent and the customer believes he, she, or it can get a 6%: the borrower may be willing to gamble a little bit. Or if the embodiment was oriented to brokers, perhaps they would be willing to take 6⅜ or 6½ at worst, if the market turned against them (every day and every minute, interest rates are changing). But borrowers and originators have a challenge (cost) to monitor where rates are and where rates are going. So an embodiment can be implemented to electronically monitor that particular borrowers are all willing to lock the loan to do business with the offeror if the interest rate goes to, say, 6⅛ or 6. That is, at a time subsequent to the loan application and obtaining the option offer, and without requiring further offeree communication, if the rate goes down to a strike price of say 6, then the loan would be automatically locked. In effect, the consumer has already essentially indicated that he, she, or it would do a deal if the rate gets down to 6. Of course, the option position can be structured to protect against adverse movement, e.g., with a higher strike price. One or both options can be taken. However, in some cases a spread may not be particularly important, e.g., in the case of a refinancing where only an improvement over an existing loan makes financial sense. That is, for example, if the rate goes above 6⅜ or 6½, there may not be a refinancing, especially if other costs and time are taken into consideration in the refinance decision.

From an offeree/borrower's point of view, again depending on the implementation, if the consumer is a gambler, an advantage would be the opportunity to get a lower interest rate. If the borrower believes that interest rates are going to go down, and if they are willing to gamble with not locking in the rate at the time of the application (or otherwise, e.g., by enduring the burden of detecting when to make an essentially contemporaneous communication to effectuate the lock), then the borrower can use an option to apply for a loan, but indicate a willingness to gamble to get a better rate. For example, the consumer may be indicating a desire to apply for a mortgage to take an interest rate of, say, 6⅜, but would rather have a rate of 6. (If the consumer can get a better interest rate, it means lower monthly payments, and so downward mortgage interest rate movement can be useful for an option situation, but at some point, the consumer may desire to go to closing rather than wait for other interest rate movement.) Of course the consumer could also obtain a "put" type of option to guard against adverse interest rate movement, and yet another embodiment is to get both "put" and "call" type options, i.e., a butterfly spread, that is preferably effectuated in one instrument or document, or at least a package.

From an offeree mortgage broker's point of view, if a borrower commits to a price, some mortgage brokers might prefer to profit from the option in a different manner. Consider, for example, the situation where a borrower has committed at a 6¼ interest rate. If the market rate went down to an interest rate of 6 and the broker has a borrower locked in at 6¼, then the broker would make more money by using an option. Inversely, if the market went to a rate of 6⅜, the broker's 6¼ lock is worth less money, but this can be protected by an option too, and it may be desirable to have an option spread.

Note that brokers and/or originators are generally paid for their loans in what is called a yield-spread premiums and discounts. If the average rate being traded in the industry is 6¼, at 6¼, no one may be paying up, and no one may be discounting. However, if the average interest rate is 6⅜, a 6¼ rate is not worth as much as the 6⅜. So it is worth less money to the broker. If the average rate is 6 and the mortgage is at 6¼, then it is worth more money because a higher yield is provided to the investor. To the broker, such a difference could mean a service offering to the broker.

Note that although the option approach differs from a float down, it does not preclude a float down and can indeed supplement it. A float down basically is a lock in that is open ended for a subsequent, one time communication from a borrower to "relock" the rate. To do this essentially one time relock, the borrower must monitor the rates. But rates can move in a moment, every day, or whatever period the lender set, so the borrower must try to constantly watching the rate. In contrast, an embodiment herein permits the borrower to obtain an option or spread and leave the lock transaction to be automatically implemented. Subsequently, depending on the implementation, the lock could comprise a subsequent float down. Another approach can include the borrower surrendering the lock in taking another option position. (As discussed further below, while the option approach can be without charge from the offeror, in view of the knowledge and increased pull through rate, there can alternatively be a charge or consideration, which may more likely occur where there is a subsequent option position and/or subsequent float down.)

Typically, a never-ending automatic float down is not used because there is too much risk to the lender without some intelligent hedge at some point. To protect against interest rate risks when there is a lock for a loan, the lender will take a position based on its belief that the loan is going to close. The lender can use an interest rate placement to hedge interest rate movement until closing. There would be enormous risk with a never ending automatic float down because the lender would not know what loans to expect to come in order to hedge to protect itself. The embodiment herein of permitting steps (lock options exercised, and then surrendered (perhaps for consideration) to obtain a subsequent lock option and/or a float down position) would permit what otherwise could seem too risky for the lender because the lender would now have a means for collecting the information to determine what kind of hedge to obtain. The present invention can encompass risk management computing, especially in a probabilistic analysis with hedging. Therefore, if a buyer exercises an option, e.g., locks in a rate, there need be nothing to prevent the buyer from walking away and getting a cheaper or otherwise better mortgage elsewhere, but though the above-mentioned multi-tiered approach can help address this.

In yet another embodiment, a broker could, in today's market, take an option with one wholesale lender, and take a lock with another. So while the broker has a lock with wholesale lender A that guarantees a rate of 6¼, the broker can take an option from wholesale lender B, and so that the broker has upside potential: if the rates go to 6, then the broker can make more money, and if the rates go to 6½ the broker is fixed with wholesale lender A.

Pricing the option, if at all, depends on the embodiment preferred for a particular situation, and cost can depend upon the offeror: it could be a "free" option, it could be a sold, or it can be a hybrid, such as free (or of one price) for the first position, and if a second option position and/or float down is taken, there could be a cost.

An economic justification for a "no price" option again depends on the particular application at issue. But for example, knowledge has value, and when a loan is otherwise originated or registered, there is an absence of certain lender information, i.e., data of what a borrower is really interested in purchasing, or at least is more interested in purchasing than what currently exists. As a consequence, the lender has set pricing and product selection not really having any idea what particular borrowers really want to buy, e.g., at what rate levels. However, with an option system, an embodiment can provide information to the lender that particular buyers would lock in if the rates got to particular points. As a consequence of this information, the lender has new knowledge to obtain, maximize, hedge, and protect profits.

A lender could offer the option without charge to the offeree obtain knowledge (data) that the applicant is not satisfied with, say, a 6¼ rate, but is looking for a rate of 6; and if the interest rates get to 6⅛, then the lender may decide to lock up their business by giving the buyer a rate of 6. The lower rate can be justified by analysis in view of profit margins. A lender may be willing to take a lower profit margin knowing that $10,000,000 more locks might come in if the lender changed its pricing by one or a few basis points. Analysis may also show that the lender might get X a certain quantity of business with a certain profit margin with a standard rate mortgage approach, or improve profit from a lower rate with an option exercising approach by obtaining a greater quantity of business. A new way to handle profit maximization is one aspect of new analysis enabled by certain embodiments set out herein: a lender can price more effectively responsive to new knowledge, and can improve profits thereby. Also, another aspect can be that if the lender believes that interest rates are going up, and the lender knows the consequence from the computer automatically locking in rates, the lender can do more reliable and precise hedging. That is, the option executed lock loans should more accurately reflect customer desires, and thus reflect increased pull through, and refinancing to a degree, and thus could extend even to a degree to asset backed securities characteristics with loans comprised there from.

Another possibility includes pricing one or more aspect of an option situation. An option can be priced, via traditional techniques such as Black Scholes, consideration being given to volatility and time, etc. An option pricing model can alternatively reflect both such traditional techniques as modified to consider profit maximization from such analysis as set out herein. For example, an open ended time option (at a refinancing trigger) could carry a price or greater price in contrast to an option for a relatively short time.

Note again, to be explicitly and perfectly clear, the option approach exemplified herein is not limited to interest rates and can apply to other factors, e.g., in mortgage pricing, for example, points or any other factor, with a consequence on how the offeror wants to handle the situation. The option itself is a mechanism of getting information, such as a floor, ceiling, or other aspect of a loan. If an offeror wants to offer different pricing combinations, situations resulting in a change to a different product, option triggering by a fixed number or in a formulaic manner or based on some other criteria (T-bill rates, whatever) these are all possibilities for implementation as may be preferred in one application or another.

Loan features could also be made subject to an option, e.g., a lock on a new product offering, or even as a mechanism for creating a new product offering, e.g., a customizable or "design your own" loan approach. Other non-price triggers can be used for a lock in option too, for example, offerees can indicate by means of the option approach that they would lock in a new product that is Sharia compliant for single family dwellings, should such a product be offered.

Thus it is but one exemplary embodiment in which the offeree is asked for what their floor and their ceiling prices are for interest rates: Where would the offeree be willing to lock in the mortgage loan if the rate drops, and/or where would the offeree would lock in the mortgage loan if the interest rates rise?

In carrying out particular embodiments, attention should be given to regulatory requirements as may apply. However, for general perspective, state law lending requirements for offering interest rate locks in a mortgage, auto loan, or lending context would seem to be noteworthy for interest rate lock options between the offeror (lender, originator) and offeree borrower. In such as business to business options, regulation for disclosure to the broker is unseemly. But in general, if the borrower is already locked in, generally whomever locked it in has the responsibility of fulfilling that locked offer, under whatever state or other laws there may be. Along with the disclosure document that the offeree may receive in a given embodiment, there can also be other documentation, preferably associated and/or generated by a computer system according to embodiment needs.

Continuing on, the option is given from an originator (offeror) to a borrower (offeree), or otherwise, conveyed as appropriate for the channel of commerce, e.g., electronically, by paper preferably generated according to the present invention, a contract, etc. While depending on the particular embodiment, the borrower may, but need not in all embodiments, know of the option, where appropriate, there can be a disclosure disclosing what the borrower (or other offeree) has chosen to do. If the borrower has chosen to exercise the lock option, then there can be a disclosure that the borrower prefers an interest rate to be secured on their behalf without giving their subsequent consent or other communication. There is a paper that they one or both sign, and the mechanics of gathering the information includes entering the information into a computer by someone suitable in the relevant business channel.

With the information conveyed from the borrower, someone on behalf of the borrower, etc. communicated directly to the originator, offeree, etc, option information is analyzed and utilized. Thus, a suitable computer system structure collects the option data, measures data corresponding to any option trigger, handles execution of the option when a trigger is satisfied, and communicates to the offeree. Generally continuing further, for a floor and/or ceiling interest rate option that the offeree chose, a hedge system can be used to determine the probability of option execution, e.g., interest rates going one way or the other, and then having those locks being placed. One approach is to use a probability model to determine the probability of certain circumstances occurring. A shock analysis can be used to aid selection of a hedge.

In shock analysis, typically there is an expectation of rates of going up and down, or up or down, by certain standard deviations. From these different deviations, a determination is made of expected "pull through," i.e., what is the expected number of locks that would turn into loans. And in one possible analytic scenario, rate shock analysis can be applied to expected locks (instead of, or rather in addition to, expected closings). For perspective, interest rate shock analysis has utility in predicting how many loans will close, and the analysis can be used as one means for determining how many of those options will result in a lock. Subsequent analysis can be used to estimate out closings.

Embodiments herein can utilize a database of the option data for, among other things, use in a new form of shock analysis as discussed subsequently. Other information in the database can include an expiration date or time (e.g., by what time, if the option has not hit the trigger (e.g., floor) by x date then there is a loan closing anyway). The options can be for a fixed period of time or be open ended, as mentioned previously. Data can include the time when the option commenced, a lock period, e.g., 30 or 60 day, what lock is being monitored (e.g., floor, ceiling, or other trigger). Other data can be gathered too, including non-numerical information, such as new product desires.

Of course the option system need not operate in isolation from other loan offerings, so data storage about the other offerings can be used to compare with option data in additional analysis. In the database, an indicator such as a flag or otherwise (e.g., absence of a flag to signify a float) can be used to identify the lock option status (e.g., option, and where appropriate, type of option, etc.), distinguishing that status as a different status from a float status or a locked status. That is, a lender can have different alternatives, including floating, lock, and/or option. And whereas, a lender only has a float status and a lock status, and typically, everything that is not locked is deemed floating, one embodiment has a new status, i.e., a status representing something that is not floating and is not locked. The status indicator is associated with the loan application, and can be used for data analysis before, and even after the closing.

The analysis of the database can include a comparison of each different status that is being offered by the lender in their products, and as a consequence of that analysis, the offeror might hedge differently. Other downstream consequences would flow from having this sort of a product too, and for example, budgeting can also be influenced and computing can handle implications as to whether or not the option approach was profitable and the degree thereof, and whether budgeting is targeted solely on the option approach or in consideration of other loan products and financial activity.

One approach is for the offeror to utilize an existing budgeting and accounting system, and another approach is to develop a different program.

The option approach can similarly influence computing related to how products are promoted and advertised. A web site for offeror/offeree/other party interaction on the product can be informative and/or facilitative of option rate lock type options transactions and the status information about them.

Information from the transactions can also be routed into the computerized handling of taxes relating to this approach, as may be folded into a combination with other products.

There can also be analysis relating to optimization, including the comparative shock analysis in determining product and product blend optimization and pricing. Such analysis can include determining how much business to get from one particular status in view of another product. For example, if the offeree has a movement on the price of the mortgage for option locks, that movement could have some effect on applications having other statuses as well, such as on locks with a float down, pull-through for locked applications, etc. Thus, the analysis can also be directed to predicting total profit from rate or other movement. Here tracking and feedback learning from experience can be utilized. Note that typically shock analysis can be used for comparing products in a lender's pipeline, as contrasted with a use for an embodiment herein to determine an influence on the lender's other products, i.e., what change in business the lender can get from itself. That is, while lenders typically do not allow people to relock a finally locked loan application with the same lender, and shock analysis can be done to calculate not only how many applicants are going to go do business with someone else, but also how many applicants will change lender products.

Computing consequences of the option approach can also extend to price determinations. Some embodiments herein can include a new component to product pricing to accommodate the option situation: for example, if an offeror decides to change pricing to get more loans from the lock option, the pricing equation is not as it was, as discussed previously.

Computing can, in a given situation, extend to business to business referrals, such as the above-mentioned incorporation of services such as free credit reports. An offeror having a lock option embodiment implemented can use the data as an end product too, with consideration given to borrower confidentiality, etc. Option-related data can also be used in communications corresponding with other lenders, in the context of indicating that if any one of them will hit a particular price, the communicator could pass the loan opportunity to the responding entity. This could result in another downstream transaction, e.g., turning around the opportunity by using the data to try to sell the opportunity to another entity. Or if a broker had a plurality of potential borrowers that would lock if anyone would offer loans at a trigger point, such as a 6% rate for a 30 year mortgage, then the broker can communicate this to others, such as wholesale lenders, that the first of any of them that provides the product at the option trigger point will effectuate a lock in of, say, 2 million dollars of business.

Products produced by the process, including all aspects of loans generated by this means, are within this invention, as are asset-backed securities flowing there from. To the extent that the resulting loans more accurately reflect what the consumer desired, the loans could have somewhat different characteristics than other loans, such in refinancing behavior, reflecting upon secondary market (e.g., asset-backed securities) behavior.

To be considered is a secondary market for the options themselves. Even though these are typically a one way options, they carry value.

Other computer aspects include a communications system, which can communicate email and/or files (and/or a paper system with digital printing and copying can be used) for connecting the relevant parties and effectuating the new communications involved, e.g., creation of a mortgage interest rate option, execution, etc. That is, while one computer can be used in some embodiments, a more likely situation will involve respective computers for the offeror and offeree side of the transaction, as well as a computer for each of the respective parties involved in the application, and means for communicating the new signal messages between them.

To effect the option, at a time subsequent to the last communication from the offeree, e.g., when rate or other trigger is met, the computer system can automatically signal for, or implement, the lock option to form a lock. That is, by means other than a contemporaneous communication from the offeree to effectuate a lock, the lock is implemented, and thus the option does not necessarily include a communication from the borrower or offeree at the time the lock in is effectuated; it can be done automatically by the computer system herein.

Again there can be communications triggered by effectuating the option, or producing signaling for the same. In doing a communication to inform a mortgage broker, for example, that the option has been exercise, or otherwise, some communications are encrypted or in some way protected so that no one interferes with the communication. The "Graham Leach Bliley" law, for example, requires certain financial institutions to protect the confidentiality of consumer information, and if the information can identify a consumer, it has to be protected or encrypted. Thus, mortgage lock option data communications are to be compliant with the law and respectful of privacy, e.g., by not sending borrower-recognizable information so that someone inappropriate would know what that borrower did.

Communicating can be carried out in different ways, depending on the implementation desired. One approach is to utilize the Internet, but another network can be used too or in addition. Some could do it on their intranet where the entity posts the information internally, and others would send emails or other communications outside their system.

Computing can be done in real time, but it depends on the situation and embodiment, e.g., needs of the parties, often particularly the offeror. Computing could be done moment to moment, end of day, periodically, etc. One approach is timing is to add this the option computing to the timetable used for doing price offerings. Some lenders, for example, have real time pricing; others do it once a day. So if the offeror is just offering pricing once a day, the computing might just do the options measurement once a day. If the offeror is doing real time pricing, this can be a suitable time for option measurement. However, it is a matter of whatever a particular offeror's internal operating capabilities and the overall parties preferences might be.

Additionally, there is a tracking system that accumulates as much data as practical, following movement of the data to learn from it, for example, trends in sources of loans or characteristics in loans. Tracking extends to shock analysis tracking, and while batch processing can be done, real time processing is useful for rapidly knowing the changing exposure to the potential of people locking the loans.

Computing for hedging can be used as well, again all depending on the embodiment for the particular situation at hand. Hedging can be carried out by taking options on mortgage backed securities and/or other delivery instruments, etc.

Embodiments herein provide more reliable information, e.g., to analyze what the locks will likely be, and then to analyze what portion of the locks will likely actually close, thereby facilitating accurate hedging.

Before the loan closing, people who are floating and people who are locked. Embodiments herein capture and store information about people who are typically floating to know when they would lock, and then another analysis system analyzes the locks to predict how many are going to close. Once a determination is made as to how many are likely going to close, then the risk can be hedged. Hedging mechanisms and calculations for other contexts can be applied to this new context, if so warranted in a particular application, for expectations of loan closings for what interest rates will result in closings. One would expect a better pull-through ratio because the option approach can give the borrower the interest rate that was a better approximation of what the borrower or offeree really desired.

(Again, some of the locks do not turn into closings for two reasons. One, the person could not get approved, or the person got a better lock. The pull-though should improve, for example, by giving the potential borrower the ability to make their own decisions, and some people, once they have made their own decisions on what interest rate they would like, they can be expected to largely stick with that decision.)

In any case, the computer system can also generate reports analyzing or contrasting internally the different pull-through or other aspects of the loans. Analysis can extend look respectively to compare and contrast behavior of each kind of loan status, for example, in terms of profitability, pull-through, etc. If desired, profitability analysis can extend to whether more (less, the same, and how much difference) profit is made in view of loans that just outright lock and then have hedging, or if more (less, the same, and how much difference) money on loans that utilize the lock option. Usage of stepped option positions can also receive such analysis.

Another embodiment includes having a product selection that is triggered by an option. For example, if a certain price (however that price might be defined, e.g., be it interest rate, points, or whatever) or other trigger is reached, a lock or change to a different product can be effectuated. Depending on the offer, then there can be a switch to a different product under which the lock option operates. This can be advantageous to others in the channel of commerce, for example where the other product may have a higher margin so that the offeror can make more profit on the loans that do close from an option-triggered product selection. It depends on what the offeror wants to make the offer on, and corresponding pricing, if any.

Additionally, the option approach can operate in connection with other mortgage features or related features, for example, insurance so that if the price changes to a certain location, a feature can be added or priced to be incorporated into the transaction. It depends on the option offer and desires of the parties, using the computer system offered herein for supporting this approach.

In sum, the embodiments tend to be directed toward computer support (including documentation, tracking, valuation, accounting, etc.) involving a mortgage or other loan interest rate lock or other characteristic option, though other possibilities exist and are exemplified herein. The computer support can include handling inputting data on options and the mortgages and related policies and products and services, analyzing the data to determine the best approach, generating documentation, producing illustrations and reports, accounting, and the like. Thus, data standards can be utilized for efficiently carrying out data handling from data templates structured as a user interface to solicit option data (such as mortgage interest rate option data). Computer support also can extend to production and reproduction of generally standardized documentation (with customization as is needed for individual transactions), digital printing, reprinting and copying, etc. Indeed, computer support can reach to many option related activities, including new or custom or individual product offerings, optimizing product fulfillment, optimizing profits, communications with any or all involved parties (including originators, intermediaries, etc.), tracking, billing and transfers (including electronic funds transfers), protected communications by encryption, records management, real time and batch processing utilizing distributed networks and/or the Internet for communications and web sites, product selections, as well as packaging with other mortgage features and related features, budgeting, tax matters, reporting, and coding to track aspects of this approach, other optimization and analysis, secondary market analysis, and even business to business referrals for associated products and services, and all with products produced by such processes.

In accordance with the apparatus (computer system(s)), methods of making and using the apparatus, and products (documentation and other output) as well as necessary intermediates (e.g., data, computations, etc.), the Figures should be viewed as illustrative teachings rather than limitations.

FIG. 1 exemplifies an embodiment, and although computer systems 2 and 4 are shown, in some embodiments, one computer system 2 can be sufficient for handling an option embodiment, though where communications are concerned, e.g., from an offeror to an offeree, the second computer is illustrative of the offeree, or some other party as may well result in various channels of trade. In each such case, the second computer system is representative of a manner of such a computer system, as provided in graphic presentation.

Consider Computer System 2 that can be adapted to handle option offeror data: (i) manipulates digital signals of (a) input data pertaining to an option, including offeree data, product specifications, pricing data, exposures, etc.; (b) model document data and template data so as to define data standards of data capture for processing and output; (c) data pertaining to other products; and (d) data pertaining to institutional activities such as budgeting, tax, secondary market data, etc., as discussed herein; (ii) digital processing program(s) to handle the data these signals to produce output (discussed further below), but for example, the shock analyses, hedging analysis, etc. as discussed herein. These aspects of computer system 2 can be understood in connection with FIG. 2, wherein offeror system 400, lock system 100, rate system 200, and monitor system 200 can be carried out on the FIG. 1 computer system 2, while the offeree system 500 of FIG. 2 can be carried out on the FIG. 1 computer system 4

Computer systems 2 and 4 are intended to be carried out in any number of ways, but in a general sense there can respectively be a digital computer 6 and 8 (e.g., an IBM Personal Computer) with central processor 10 and 12 (e.g., an Intel series processor), a memory system 14 and 16 (such as a hard drive), an input device 18 and 20 (keyboard, mouse, modem, or the like), and one or more output devices, here shown as output device illustrated multiply as 22 and 24 (e.g., a Hewlett Packard printer, a Dell monitor, a modem, or other such output device). The memory system 14 and 16 can include an operating system Logic Means or program to run the computers 6 and 8 and facilitate applications software or other program 26 and 28. For example, the operating system could be Microsoft XP Professional that would allow use of (a) its applications software, such as EXCEL, ACCESS, and WORD, and (b) pricing systems compatible with Microsoft XP Professional such as AXIS, TAS, or PROPHET. The memory system 14 and 16 can store other program(s), such as the foregoing, i.e.: (a) a word processing program such as Microsoft Word to process options and transactions data, and results, (b) a data management program such as Microsoft EXCEL or ACCESS to manage and evaluate data files, (c) the respective systems shown on FIG. 2, (d) a data specifications for template and other input/output handling, such as a hard coded or programmed application that translate one data file format to the suitable data file format, and encryption systems, such as public key private key, as may be appropriate. The input device 18 and 20 such as a keyboard receives input data either manually or electronically, depending on the embodiment preferred for a particular application hereof. Output device 22 and 24, such as a printer or a CD drive; produce such documents or document packages, in generally standardized manner, though as mentioned herein, customization is also within the comprehension herein. It should be recognized again that the computer systems correspond to any first party (such as an offeror), any other party, (such as an offeree, third party, tax advisor, accounting advisor, marketing advisors, legal advisor, the Internet or another network, other consultants, regulatory bodies, secondary market players, etc.), wherein the communications link 1 can be a network, the Internet, web site, etc.

A computer-readable media can tangibly embody a program of instructions executable by such as computers 6 and 8 to perform the steps of computer-aided methods herein, and for example, by using data standardized for input by at least one computer-generated template and for output by standardized documentation obtained from computer-accessible memory 14 and 16. Similarly, a computer-readable media can tangibly embody a program of instructions executable by the suitable computer for carrying out other or downstream computing. Again, the media of can comprise at least one of a RAM, a ROM, a disk, an ASIC, and a PROM.

Likewise, memory 14 and 16, or other computer-readable media, can tangibly hold data (structure) for access by such application program being executed by any or all of the computer 6 and 8.

Of course depending on the embodiment that is at issue, the data requirements will change correspondingly, processing will change correspondingly, and output will change correspondingly.

Viewed as a transmission system, as data stored in memory, or processing relating thereto, at issue is information the pertaining to the option approach that is communicated from computer 6 to computer 8. Such communications are unique in relation to the option particulars of the embodiment at issue.

Figure 2:
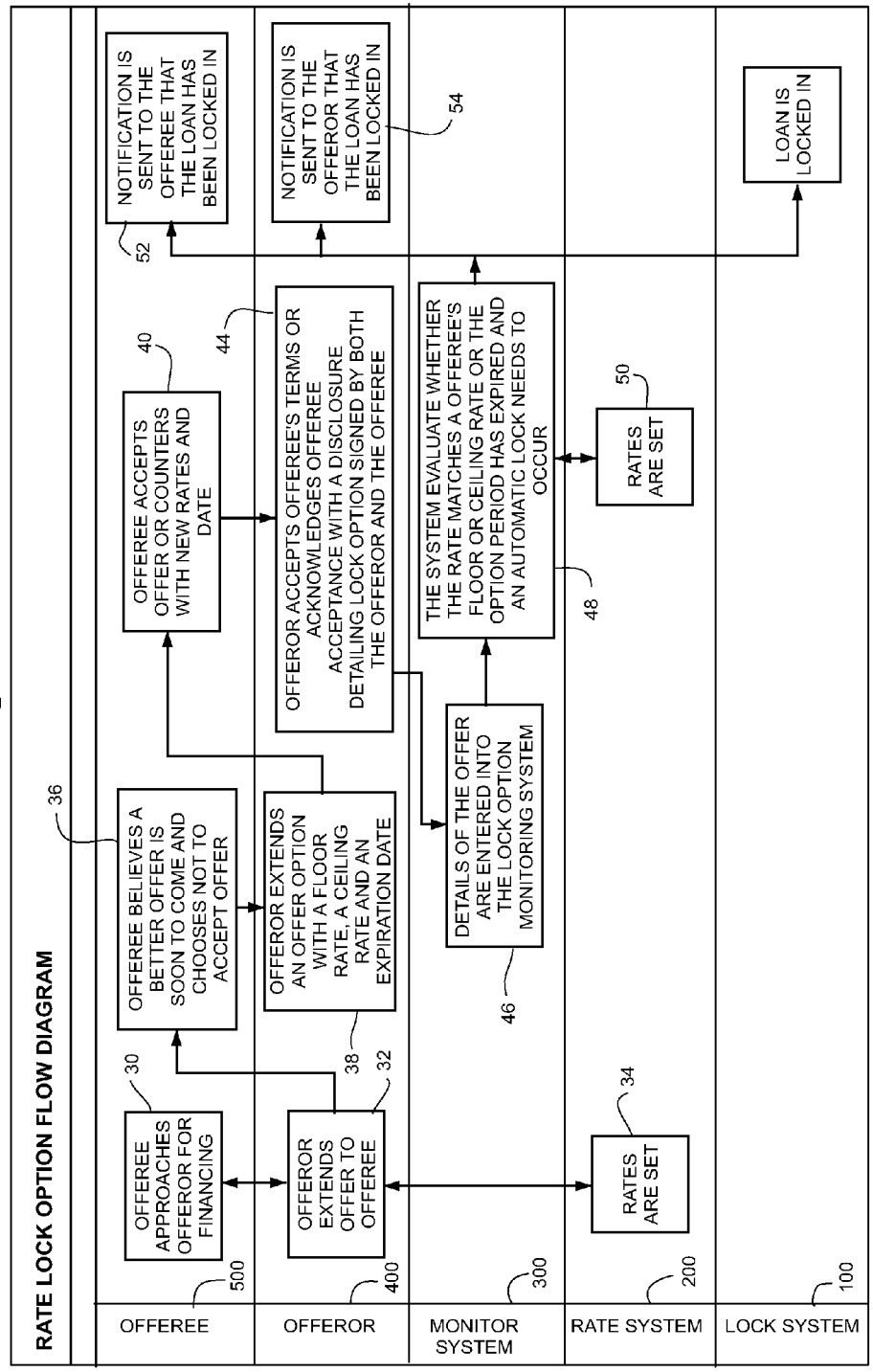
FIG. 2 illustrates a rate lock option flow diagram for an embodiment.

Turning now to FIG. 2, there is shown a representative rate lock flow diagram. In block 30, an offeree approaches an offeror for financing. The offeror, in block 32, extends an loan offer to the offeree, such as a loan with a lock, a float, or a lock with a float down. The offer will reflect utilization of rates 34. In block 36, the offeree may for whatever reason not accept the offer. In block 38, the offeror extends an offer of an option, e.g., with a floor rate, a ceiling rate, and an expiration date, or whatever trigger may be appropriate. In block 40, the offeree can accept the option or can counter by specifying the particulars of the option. At block 44, the offeror can accept the counter option terms or acknowledge the offeree's acceptance by generating a disclosure detailing the option, the disclosure document being signed by one or more of the offeror and offeree. In block 46 the details of the option are entered into the option monitoring system 300. The system 300 evaluates whether the rates set in block 50 (or other characteristic specified) matches the floor, ceiling, etc. during the option period, in block 48. If circumstances come about for a triggering of the option, then a signal is sent to the offeree that the loan has been locked in at block 52. If the option system is being operated by a party providing computing services, or as a record for data storage by the offeror, notification is also provided to the offeror at block 54. Then processing of a locked in loan is carried out in box 56.

Although only a few exemplary embodiments have been described in detail above, those skilled in the art will readily appreciate that many modifications are possible in the exemplary embodiments without materially from the novel teachings and advantages herein. Accordingly, all such modifications are intended to be included within the scope defined by claims. In the claims, means-plus-function claims are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment fastening wooden parts, a nail and a screw may be equivalent structures.

The invention claimed is:

1. Apparatus to control a loan option, the apparatus comprising:
   a computer system which comprises a programmed processor and which is controlled to carry out the steps of:
   receiving specifications for an option on a loan, the specifications including a trigger to execute the option;
   receiving other data; and
   evaluating the trigger with respect to the other data, and if the trigger occurs, signaling to execute the option.

2. The apparatus of claim 1, wherein the computer is programmed to receive a borrower communication in an application completed over the Internet.

3. The apparatus of claim 1, wherein the option for the loan comprises an option for a mortgage loan; and further including:
   a database of data relating to mortgage loan applications, the database including an indicator of an application status other than a lock status and a float status; and wherein
   said computer is programmed to access the database to analyze the status information in carrying out closings of some of the loans.

4. The apparatus of claim 1, wherein the trigger is an interest rate for a lock for a mortgage according to the option.

5. The apparatus of claim 4, wherein the interest rate trigger is a floor.

6. The apparatus of claim 4, wherein the interest rate trigger is a ceiling.

7. The apparatus of claim 3, wherein the interest rate trigger is comprised of a floor and a ceiling.

8. A computer-readable media tangibly embodying a program of instructions which when run on a computer causes the computer to perform the steps of:
   receiving specifications for an option on a loan, the specifications including a trigger to execute the option;
   receiving other data; and
   evaluating the trigger with respect to the other data, and if the trigger occurs, signaling for execution of the option.

9. Apparatus including:
   a plurality of computers programmed to on a loan, wherein one of the computers is programmed to carry out the steps of:

receiving specifications for an option on a loan, the specifications including a trigger to execute the option;

receiving other data; and evaluating the trigger with respect to the other data, and if the trigger occurs, transmitting a communication corresponding to execution of the option to another of the plurality of computers which facilitates closing of the loan.

10. A computer-readable media tangibly embodying a program of instructions executable by a computer to perform the steps of:

receiving specifications for an option on a loan, the specifications including a trigger to execute the option;

receiving other data; and evaluating the trigger with respect to the other data, and if the trigger occurs, transmitting a communication corresponding to effectuation of the option to another computer which facilitates closing of the loan.

11. A computer-aided method of carrying out an option on a loan, the method including the steps of:

receiving, with a computer system, specifications defining an option on a loan, the specifications including a trigger to execute the option;

evaluating the trigger with the computer by accessing further data; and if the trigger is detected, signaling execution of the option.

12. The method of claim 11, wherein the step of receiving is carried out with the trigger being an interest rate for a lock for a mortgage.

13. The method of claim 12, wherein the step of receiving is carried out with the interest rate trigger being a floor.

14. The method of claim 12, wherein the step of receiving is carried out with the interest rate trigger being a ceiling.

15. The method of claim 12, wherein the step of receiving is carried out with the interest rate trigger being comprised of a floor and a ceiling.

16. Apparatus comprising:

a plurality of computers controlled by respective programs, the computers arranged to communicate data structured to identify an option on a loan; and means for effectuating the option, corresponding to an evaluated option execution trigger signal, to control closing of the loan.

17. The apparatus of claim 16, further including means for computing a secondary market characteristic related to the option.

18. The apparatus of claim 16, wherein the option for the loan comprises an option for a mortgage loan; and further including:

a database of data relating to mortgage loan applications, the database including an indicator of an application status other than a lock status and a float status; and wherein one of said computers is programmed to access the database to analyze the status information in carrying out closings of some of the loans.

19. A computer apparatus to implement a loan, the apparatus including:

a database of data relating to mortgage loan applications, the database including an indicator of an application status other than a lock status and a float status, the indicator corresponding to an evaluated trigger which signaled to execute the option; and a computer accessing the database to for the status information in carrying out a closing of a loan.

20. The computer apparatus of claim 19, wherein the indicator indicates an option status.

21. The computer apparatus of claim 20, wherein said database includes at least one of a floor, a ceiling, and both, in association with said option status.

22. The computer apparatus of claim 19, wherein the computer uses shock analysis on said application status loan applications.

23. The apparatus of claim 19, further comprising a plurality of computers controlled by respective programs, the computers arranged to communicate data structured to identify an option on a loan corresponding to one of said mortgage applications, one of said computers effectuating the option in facilitating closing of the loan.

24. The apparatus of claim 19, further comprising a computer programmed to carry out the steps of receiving specifications for an option on the loan, said loan corresponding to one of said mortgage applications, the specifications including a trigger to execute the option, evaluating the trigger with respect to other data, and if the trigger occurs, signaling execution of the option.

\* \* \* \* \*